(No Model.)

J. McPARTLAND.
VEHICLE SEAT.

No. 474,097. Patented May 3, 1892.

Witnesses
G. Stansbury
E. B. Sandson

Inventor
John McPartland
By his Attorneys
Hall & Co.

THE NORRIS PETERS CO., PHOTO-LITHO., WASHINGTON, D. C.

UNITED STATES PATENT OFFICE.

JOHN McPARTLAND, OF WAKEFIELD, RHODE ISLAND.

VEHICLE-SEAT.

SPECIFICATION forming part of Letters Patent No. 474,097, dated May 3, 1892.

Application filed November 18, 1891. Serial No. 412,289. (No model.)

*To all whom it may concern:*

Be it known that I, JOHN McPARTLAND, a citizen of the United States, residing at Wakefield, in the county of Washington and State of Rhode Island, have invented certain new and useful Improvements in Seats for Buckboard Vehicles; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to seats for buckboard vehicles; and its objects are, first, to provide optionably one or two seats; second, to provide that the two seats shall face the same direction or opposite directions, as desired; third, to provide that the rear seat may be altered in distance from the front one; fourth, to obtain a durable corelation and juxtaposition of the parts, and, fifth, to attain these ends with structural simplicity and economy. I accomplish these ends by the device illustrated in the accompanying drawings, in which—

Figure 1:
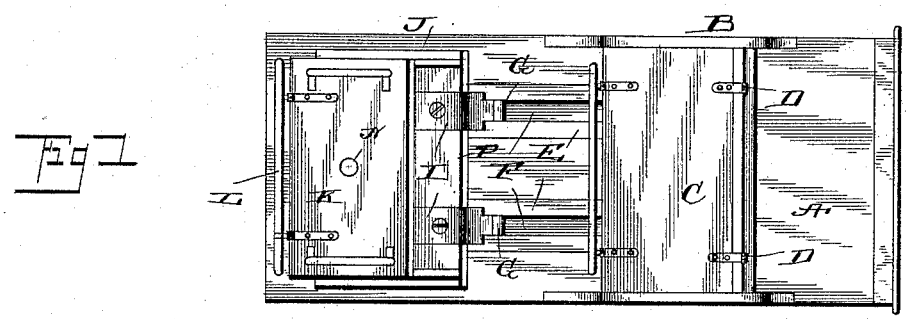
Figure 2:
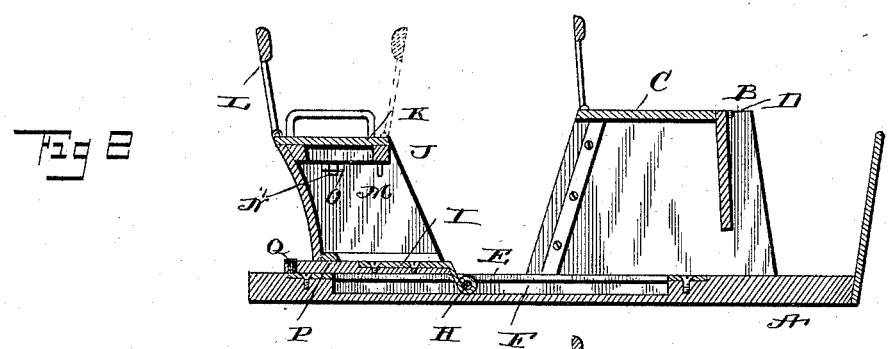
Figure 3:
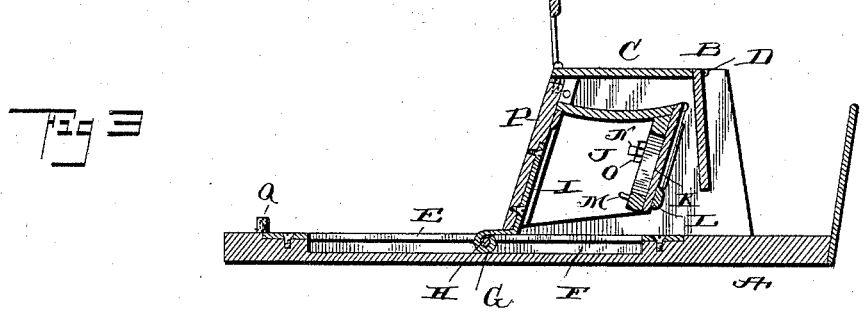
Figure 4:
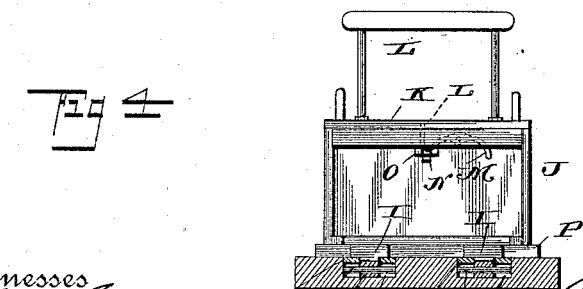

Figure 1 represents a plan view of a buckboard embodying the essential elements of my invention. Fig. 2 is a side view of the buckboard, showing the relative position of the seat, indicating in dotted lines the reversibility of the rear revolving seat. Fig. 3 shows the rear seat folded under the front seat, and Fig. 4 is a rear end view of the adjustable rear seat.

The same designations indicate corresponding parts in all the views.

A indicates the buckboard, having two parallel grooves F between flanges E equidistantly arranged from its longitudinal center. The forward seat C is pivoted at D to the stationary frame B. The rear seat K, whose back L is shown in dotted lines in reversed position, is mounted on a screw O, revolving in nut N, attached to the frame J. The frame J has secured to its base P two angle-irons I, terminally rounded at G to inclose pins H, sliding between the flanges E in the grooves F.

M is a pivoted catch that locks the revolving seat K.

Q is a pin limiting the travel of the base P.

It will be understood that in practice the buckboard can have the rear seat folded under the front seat, as shown in Fig. 3, or the rear seat can be located as in Fig. 2, or the rear seat can be placed to infringe the front seat, the seat then being revolved to face backward.

I am aware of the patent granted to G. E. Spare on the 4th day of March, 1890, numbered 422,649, and hereby disclaim the same.

Having thus fully described my improvements, what I claim is—

In a vehicle, the combination of the buckboard having two parallel grooves equidistantly disposed on either side of a longitudinal median line, the rotary seat having attached to its base sliding hinges capable of reciprocating in said grooves, said seat being, moreover, provided with an independent adjustable back and capable of being folded under the front seat, and the stationary hollow front seat capable of accommodating thereunder the rear seat when folded, as and for the purpose set forth.

In testimony whereof I affix my signature in presence of two witnesses.

JOHN McPARTLAND.

Witnesses:
EDEN BURDICK,
GEO. S. NEWTON.